United States Patent
Hatteland et al.

(10) Patent No.: US 12,466,651 B2
(45) Date of Patent: Nov. 11, 2025

(54) METHOD AND COMPUTER PROGRAM FOR CONTROLLING STORAGE AND RETRIEVAL OF PERSONAL STORAGE CONTAINERS IN AN AUTOMATED STORAGE AND RETRIEVAL SYSTEM

(71) Applicant: Autostore Technology AS, Nedre Vats (NO)

(72) Inventors: Magne Hatteland, Stavanger (NO); Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 966 days.

(21) Appl. No.: 17/599,968

(22) PCT Filed: Mar. 16, 2020

(86) PCT No.: PCT/EP2020/057133
§ 371 (c)(1),
(2) Date: Sep. 29, 2021

(87) PCT Pub. No.: WO2020/200741
PCT Pub. Date: Oct. 8, 2020

(65) Prior Publication Data
US 2022/0144544 A1 May 12, 2022

(30) Foreign Application Priority Data
Mar. 29, 2019 (NO) .................................. 20190433

(51) Int. Cl.
*G07C 9/32* (2020.01)
*B65G 1/137* (2006.01)
(Continued)

(52) U.S. Cl.
CPC ....... *B65G 1/1371* (2013.01); *G06F 16/2457* (2019.01); *G06F 16/248* (2019.01);
(Continued)

(58) Field of Classification Search
CPC ..... B65G 1/1371; B65G 1/04; G06F 16/2457; G06F 16/248; G06K 19/0723;
(Continued)

(56) References Cited

U.S. PATENT DOCUMENTS

| 4,609,780 A | 9/1986 | Clark |
| 6,697,781 B1 * | 2/2004 | Sahlberg ................. G10L 13/00 |
| | | 704/271 |

(Continued)

FOREIGN PATENT DOCUMENTS

| CA | 3063294 A1 | 11/2018 |
| JP | 2003301664 A | 10/2003 |

(Continued)

OTHER PUBLICATIONS

Anonymous, Notice of Preliminary Rejection, Korean Patent Application No. 1020217035184, dated Apr. 23, 2024, 10 pages, pub. by the Korean Intellectual Property Office.

(Continued)

*Primary Examiner* — Patrick H Mackey
(74) *Attorney, Agent, or Firm* — Baker Botts L.L.P.

(57) ABSTRACT

A method and computer program product controls the transferring of a storage container for storing items by transferring the storage container via access station at an interaction area among a plurality of interaction areas of an automated storage and retrieval system. The storage container is linked to a user and items stored. The method performed by the computer program product includes specific modules performing different steps of the method. The modules include a user identification module processing user identification (Continued)

data and giving access to the system, a registration module registering items to be stored in an inventory database, a search module for searching for stored items in the inventory database, a presentation module presenting search results and items stored, and an execution module generating instructions that via a communication module is instructing a system controller of the automated storage and retrieval system to retrieve or store a specific storage container.

21 Claims, 6 Drawing Sheets

(51) Int. Cl.
    *G06F 16/2457*      (2019.01)
    *G06F 16/248*      (2019.01)
    *G06K 19/07*      (2006.01)
    *G06Q 10/087*      (2023.01)

(52) U.S. Cl.
    CPC ....... *G06K 19/0723* (2013.01); *G06Q 10/087* (2013.01); *G07C 9/32* (2020.01); *B65G 2203/0216* (2013.01); *B65G 2203/046* (2013.01)

(58) Field of Classification Search
    CPC .. G06K 7/10297; G06Q 10/087; G06Q 10/08; G06Q 10/0837; G06Q 10/06312; G06Q 10/06314; G06Q 10/0838; G07C 9/32; G05B 19/41
    See application file for complete search history.

(56) References Cited

U.S. PATENT DOCUMENTS

| | | | | |
|---|---|---|---|---|
| 12,065,311 | B2* | 8/2024 | Paepcke | ............... B65G 1/04 |
| 2004/0002869 | A1* | 1/2004 | Ekstein | ............... G06Q 30/06 |
| | | | | 705/26.1 |
| 2007/0226088 | A1* | 9/2007 | Miles | ............... G06Q 10/10 |
| | | | | 705/28 |
| 2012/0144334 | A1 | 6/2012 | Reichert | |
| 2015/0169829 | A1 | 6/2015 | Jaynes | |
| 2017/0032306 | A1 | 2/2017 | Johnson et al. | |
| 2018/0005167 | A1 | 1/2018 | Smith | |
| 2018/0170673 | A1* | 6/2018 | Seeley | ............... G06Q 10/087 |
| 2018/0201445 | A1 | 7/2018 | Battles et al. | |
| 2021/0155407 | A1 | 5/2021 | Austrheim et al. | |
| 2022/0144544 | A1 | 5/2022 | Hatteland et al. | |
| 2022/0194705 | A1* | 6/2022 | Hatteland | ............ B65G 1/0485 |

FOREIGN PATENT DOCUMENTS

| | | |
|---|---|---|
| JP | 2004-100233 A | 4/2004 |
| JP | 2006-290590 A | 10/2006 |
| JP | 2010-105756 A | 5/2010 |
| JP | 2022528849 A | 6/2022 |
| WO | 2009082779 A1 | 7/2009 |
| WO | 2014090684 A1 | 6/2014 |
| WO | 2017211596 A1 | 12/2017 |
| WO | WO-2018155060 A1 * 8/2018 ............. B65G 1/137 |

OTHER PUBLICATIONS

Search Report issued in Norwegian Application No. 20190433; Dated Oct. 28, 2019 (2 pages).
International Search Report issued in International Application No. PCT/EP2020/057133, mailed Apr. 9, 2020 (3 pages).
Written Opinion issued in International Application No. PCT/EP2020/057133; Dated Apr. 9, 2020 (6 pages).
International Preliminary Report on Patentability issued in International Application No. PCT/EP2020/057133; mailed Apr. 9, 2020 (13 pages).
Office Action issued in counterpart Japanese Patent Application No. 2021-557749 mailed on Jan. 29, 2024 (12 pages).
Chang Bingyu, First Office Action for Chinese Patent Application No. 202080039740X, dated Mar. 1, 2025, 29 pages, pub. by SIPO, Beijing, China.
Bingyu Chang, Examining action in counterpart Chinese patent application 202080039740.X, pub. by State Intellectual Property Office (SIPO), Beijing, China, Jul. 5, 2025 (11 pages), with English translation and list of cited references (16 pages).
Nakata, Seijiro, Office Action in JP2024106263, mailed Jul. 29, 2025, 13 pages, Japan Patent Office, Tokyo, Japan.
Viets, Ana, Extended European Search Report in EP25179004.4, mailed Sep. 1, 2025, 8 pages, European Patent Office, Munich, Germany.

* cited by examiner

METHOD AND COMPUTER PROGRAM FOR CONTROLLING STORAGE AND RETRIEVAL OF PERSONAL STORAGE CONTAINERS IN AN AUTOMATED STORAGE AND RETRIEVAL SYSTEM

INTRODUCTION

The present invention relates to a method and computer program for controlling storage and retrieval of personal items in an automated storage and retrieval system serving different interaction areas handled by different persons.

BACKGROUND AND PRIOR ART

There are different examples of automated storage and retrieval systems for transferring and retrieving items stored in storage containers. FIG. 1 shows an example of a storage and retrieval system having a framework structure defining a storage grid 3. The structure forms storage columns for storing storage containers, also known as bins. In the example shown, storage containers are handled by moving a lifting device in x- and y-directions above the storage columns and bringing storage containers to and from an access station. Vehicles or robots can be used instead of said lifting frame for handling containers. This configuration is described in WO2014/090684A1, the contents of which are incorporated herein by reference.

In the following, the expression robot is used as a collective term describing a device handling a storage container e.g. moving it between a storage grid and a container transport assembly used for transferring storage containers to and from interaction areas with access stations.

When picking up or storing a specified storage container in a storage and retrieval system, a storage and retrieval system controller 100 sends control commands to a robot. The system comprises an updatable database storing data defining where each storage container is located and its contained items, e.g. storage container with item #122 is in column [3,4] at level 4 below a topmost storage container at level 1. A robot will then drive to column [3,4], remove the upper three storage containers and then retrieve the next storage container storing item #122. Storage containers blocking the storage container with items #122 can also be removed by other co-operating robots. Items placed in a storage container are typically registered by a barcode scanned when being placed in the storage container.

The access station may be a picking or a stocking station where items are removed from or positioned into the storage containers. Known automatic storage systems only have one or a few picking and stocking stations where all stored storage containers can be accessed by different persons.

When an automated storage and retrieval system comprises a plurality of different interaction areas with access stations, where storage containers can be accessed from the outside of the system, and where only specific identifiable storage containers are to be accessed by an identified person at each access station, there is a need for a secure way of providing this functionality.

This scenario is applicable if an automated storage system as described above is installed in for instance an apartment block for serving different apartments, and where an access station is available in each apartment. Storage containers with personal items from different apartments will be stored in the same storage and retrieval system. It is then vital that only items registered and stored in a storage container by a specific person are accessible for that person only.

SUMMARY

The present invention comprises a method and computer program for secure controlling of storing and retrieving of personal items in an automated storage and retrieval system connected to a plurality of interaction areas placed at different locations such as e.g. within an apartment building, a terraced house, or other buildings that are shared by multiple people, for example, nursing homes, student accommodation, army barracks or similar. The invention will provide an easy secure way of moving storage containers between the storage and retrieval system and an access station at a specific interaction area.

The method and computer program according to the invention can be used for controlling different configurations of an automated storage and retrieval system. For instance, one installed in a basement, an attic, or in between interaction areas in a building. The container transport assembly, connecting a storage grid to interactions areas, will be adapted to the floor plan and type of building where it is installed. It may accordingly comprise a vertical or inclined storage container transport assembly or a horizontal conveyor.

A benefit of using the method and computer program according to the invention, for controlling access to storage containers in a centralised and compact automated storage and retrieval system, is the security it provides.

SHORT DESCRIPTION OF THE INVENTION

If a storage and retrieval system is used in a single house, the system typically has one or a few users having access to all interaction areas where containers for storing and retrieving items are available, e.g. multiple interaction areas with one interaction area on each floor. A user can then decide on which floor he or she wants the storage container to be delivered to.

If installed in an apartment building or other buildings with multiple users, where the users have access to specific containers via access stations at interaction areas, the system may be provided with a verification system, both for verifying that a user requesting a specific storage container shall have access to it, and that the user has access to the dedicated access station interaction area. In the following description the expression interaction area is used to describe the area where a user is interacting with the storage and retrieval system via an access station. Interacting typically means storing or retrieving a storage container for storing personal items.

A human interface is used for controlling transport of a storage container from a storage position in a storage column of the automated storage system to a dedicated interaction area. For doing this a user will operate a user operable control system running a software application (App) comprising different modules enabling searching for and presenting items stored in containers, and for communicating with a storage and retrieval system controller that will control a robot to pick up a specified storage container from a given storage position in the automated storage and retrieval system.

The present invention is defined by a method for controlling secure storing and retrieving of a storage container for storing items by transferring the storage container via an interaction area among a plurality of interaction areas of an automated storage and retrieval system, where the storage container is linked to a user and items stored, and where the method is performed by a computer program product comprising specific modules performing different steps of the method. The method comprises the following steps:
  receiving user identification data in a user identification module and processing the user identification data to identify the user and if the user is identified granting access to an access station at the interaction area so that the user can store or retrieve a storage container linked to the user and add or remove an item from it;
  for storing an item of a user granted access to the access station: registering the item in a registration module and linking the item to an identified storage container linked to the user, and updating an inventory database with information about the item and the storage container;
  for retrieving an item of a user granted access to the access station: searching for the item in the inventory database by means of a search module and presenting search results and items stored by means of a presentation module, and selecting the item to be retrieved from the presentation module;
  generating execution instructions in an execution module, the instructions comprise information of the specific interaction area to be used and information of the storage container to be transferred and transmitting the execution instructions, by means of a communication module to a storage and retrieval system controller controlling secure transferal of the storage container, or an item associated with the storage container, to and from the user at the specific interaction area.

Additional features of the method are defined in the claims.

The invention is further defined by a computer program product comprising different modules that when executed in a processor controls secure storing and retrieving of a storage container for storing items by transferring it via one specific interaction area among several interaction areas of an automated storage and retrieval system, where the storage container is linked to a user and items stored.

The computer program product comprises:
  a user identification module for identifying a user and controlling access for the user to a specific interaction area;
  a registration module for registering and linking items to an identified storage container storing them and for updating the inventory database with information about the items and the storage container;
  a search module for searching for items in the inventory database;
  a presentation module for presenting search results of stored items;
  an execution module for generating execution instructions comprising information about the specific interaction area to be used and information of the storage container to be transferred, and
  a communication module for transmitting the execution instructions to a storage and retrieval system controller controlling secure transferring of the storage container to and from the user at the specific interaction area.

Additional features of the computer program are defined in the claims.

DETAILED DESCRIPTION OF THE INVENTION

The present invention will now be described in detail by way of examples only and with reference to the figures where:

The present invention relates to a method and computer program interacting with an inventory database and for controlling a centralized automated storage and retrieval system for transferring storage container with personal items at an interaction area where a person is granted access to storage containers storing his or her items.

Figure 1:
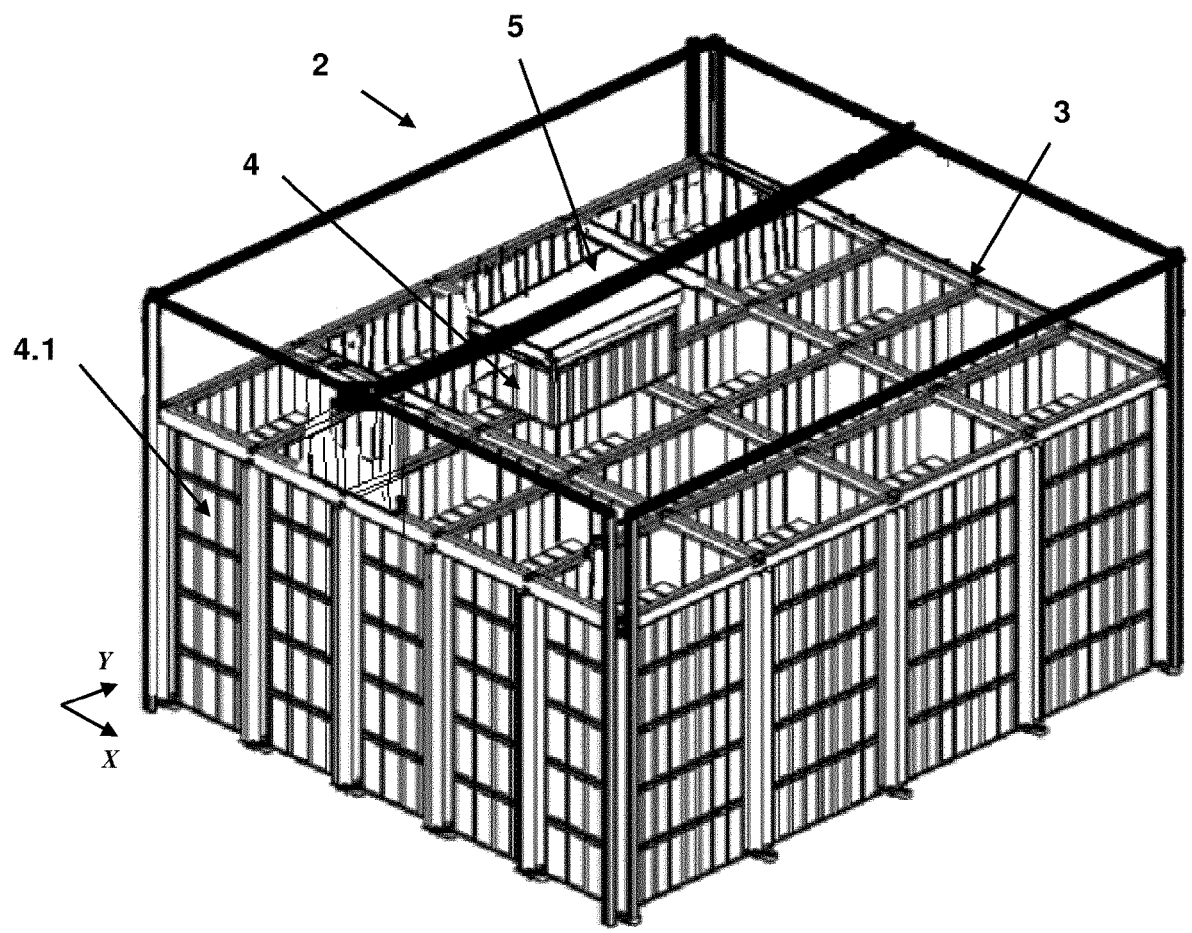
FIG. 1 shows an example of an automated storage and retrieval system according to the prior art.

FIG. 1 shows an example of a prior art automated storage and retrieval system where a robot 5 is handling storage containers 4 to and from columns 4.1 of the storage grid 3. The figure shows one robot 5 connected to and operated by means of a suspension system moving the robot in X- and Y-directions above the storage and retrieval system 2, thereby enabling access to all columns 4.1 for storing storage containers 4. Other types of robots may be used, for instance robots running on a rail system on top of the columns, as well as more than one robot. Use of several robots is relevant for larger storage and retrieval systems 2.

Figure 6:
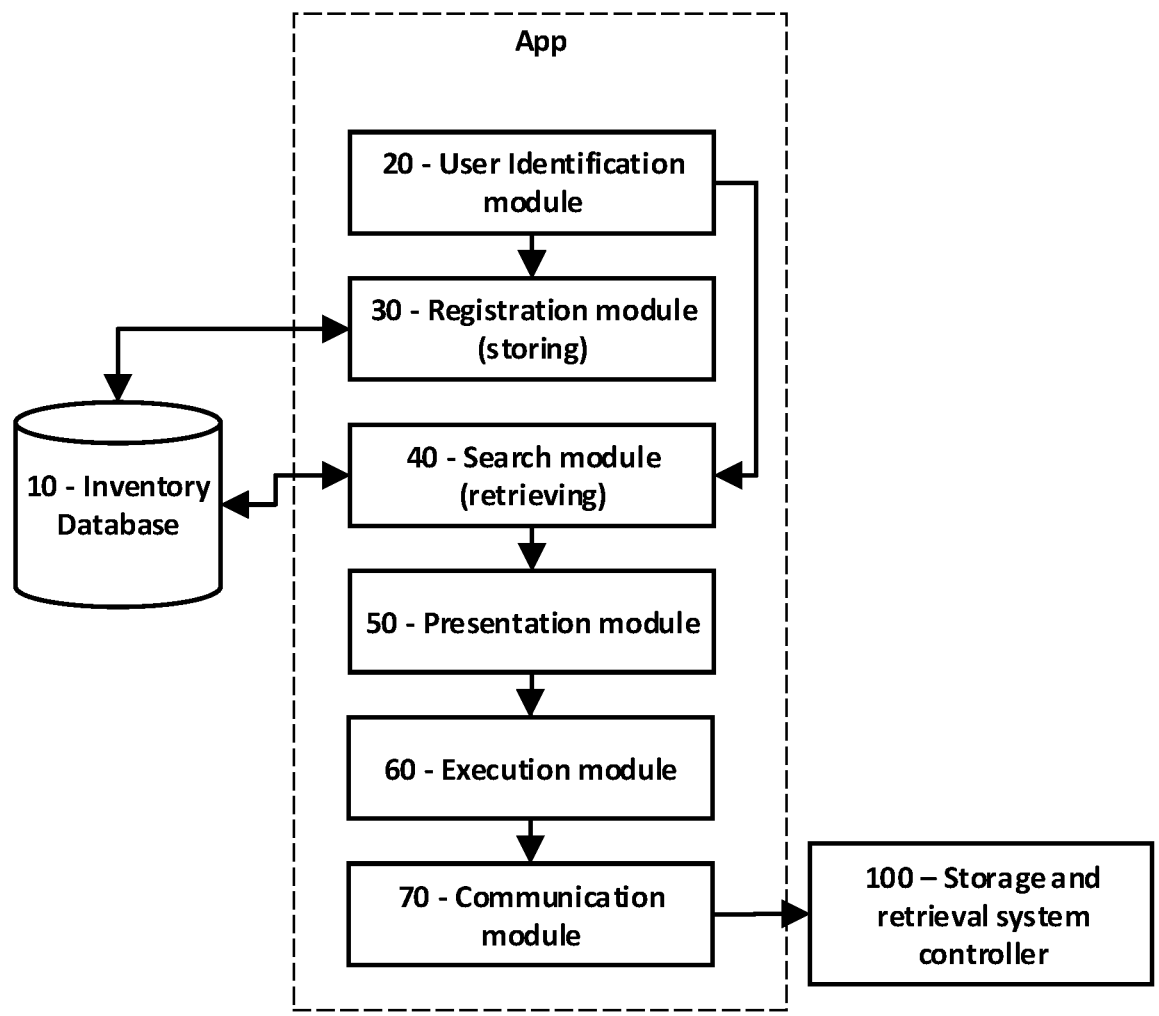
FIG. 6 shows the different modules comprised in the computer program according to the invention.

A central system controller 100 (ref. FIG. 6) is provided with information about the physical parameters of the storage and retrieval system. These are input parameters when setting up a system, e.g. number of columns, how many storage containers 4 each column 4.1 may store, the number of interaction areas where storage containers 4 are input or output etc. A database storing these data is comprised in the storage and retrieval system 2 as well as updated data of where each storage container 4 is located.

Prior art systems do not differentiate between different interaction areas and persons having access to them. That is, storage containers 4 can be delivered and picked up at any interacting area by any person. When installed in an apartment building it is vital to differentiate between interaction areas and the persons having access to them.

Figure 2:
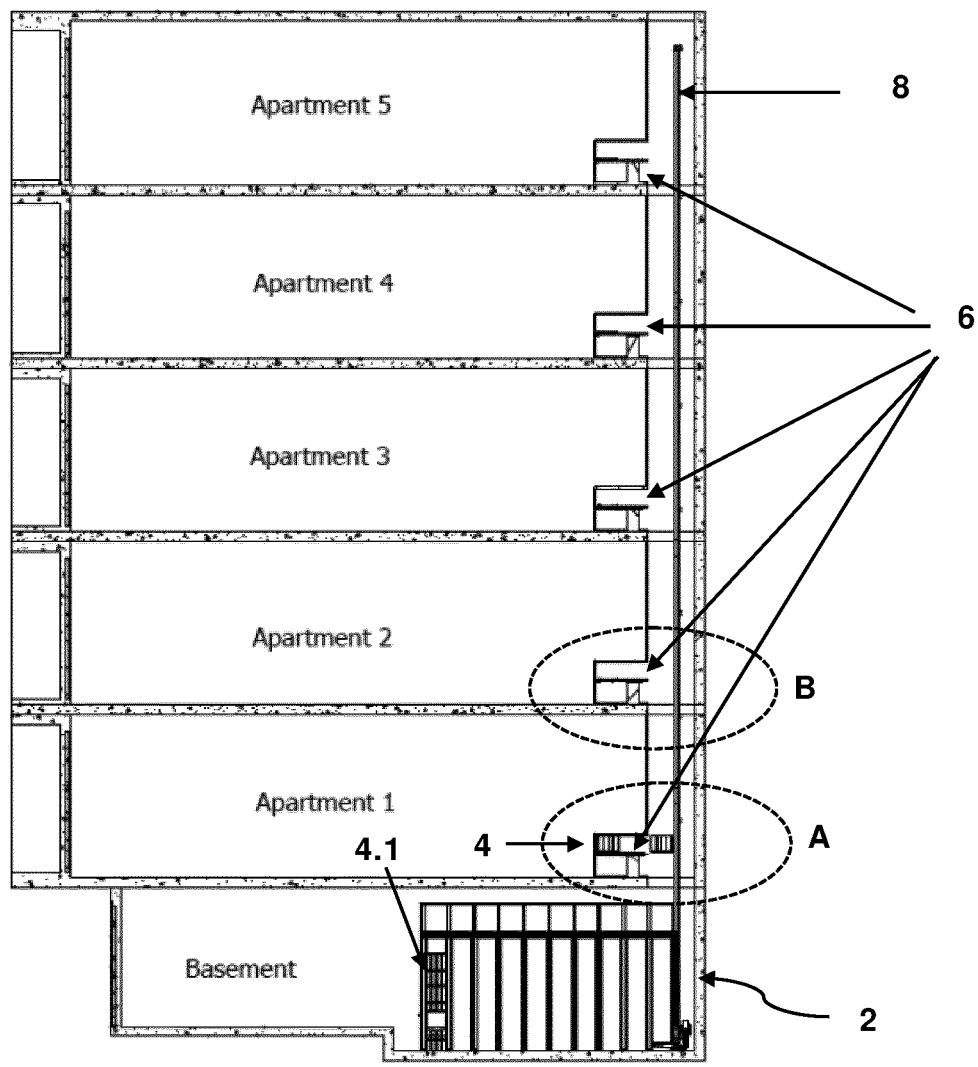
FIG. 2 shows an example of a centralised automatic storage and retrieval system serving different apartments.

FIG. 2 shows an example of a centralised automatic storage and retrieval system serving different apartments 1 to 5. The figure shows a side view of a five storeys apartment building with a basement wherein the centralised automated storage and retrieval system 2 is arranged. This is purely illustrative and intended to be exemplary; the building could of course comprise any number of apartments and any number of levels. In the figure, five apartments are located above the basement. A vertical container transport assembly 8 connects the automated storage and retrieval system 2 with interaction areas 6 at each floor for transferring a storage container 4 from the automated storage and retrieval system 2 to interaction area(s) 6 and vice versa. Each interaction area 6 has an access station with controlled access to the automatic storage and retrieval system 2.

The automated storage and retrieval system 2 has a framework structure defining a storage grid 3 for storing storage containers 4 arranged in stacks in storage columns 4.1 and at least one container handling vehicle 5 configured to raise storage containers 4 from and lower storage containers 4 into the storage columns 4.1 and to transport storage containers 4 to and from a container transport assembly 8 connecting the automated storage and retrieval system 2 to a plurality of interaction areas 6 for accessing and transferring storage containers 4 to and from the automated storage and retrieval system 2.

The automated storage and retrieval system 2 further comprises a storage and retrieval system controller 100 (ref. FIG. 6) keeping track of storage containers 4 and their location in the automated storage and retrieval system 2 and for controlling container handling robot(s) 5 for storing and retrieving storage containers 4.

The vertical container transport assembly 8 shown in FIG. 2 is in this example a lift comprising a storage container support wherein a storage container 4 is placed allowing the storage container 4 to be transported in the vertical direction from the automated storage and retrieval system 2 to the interaction areas 6 and vice versa. It is a common lift shared by a plurality of apartments that extends between the apartments and the basement (or other designated level) comprising the storage grid 3 for storing the storage containers.

This solution requires a new way of controlling storing and retrieving of items between different apartments and the centralised storage and retrieval system 2.

A new solution is provided by a method and computer program for controlling and securing that storage containers 4 linked to a specific person are available for that person only. The method is performed by a computer program registering in a data set which items that are stored in a specific storage container 4, where the specific storage container 4 is stored in the storage grid 3, which users shall have access to it and which interaction area(s) 6 access to the storage container is available.

The present invention is defined by a method for controlling transfer of storage containers 4 between an automated storage and retrieval system 2 and an interaction area 6, by interacting with an inventory database containing information about items stored in storage containers 4.

Figure 3:
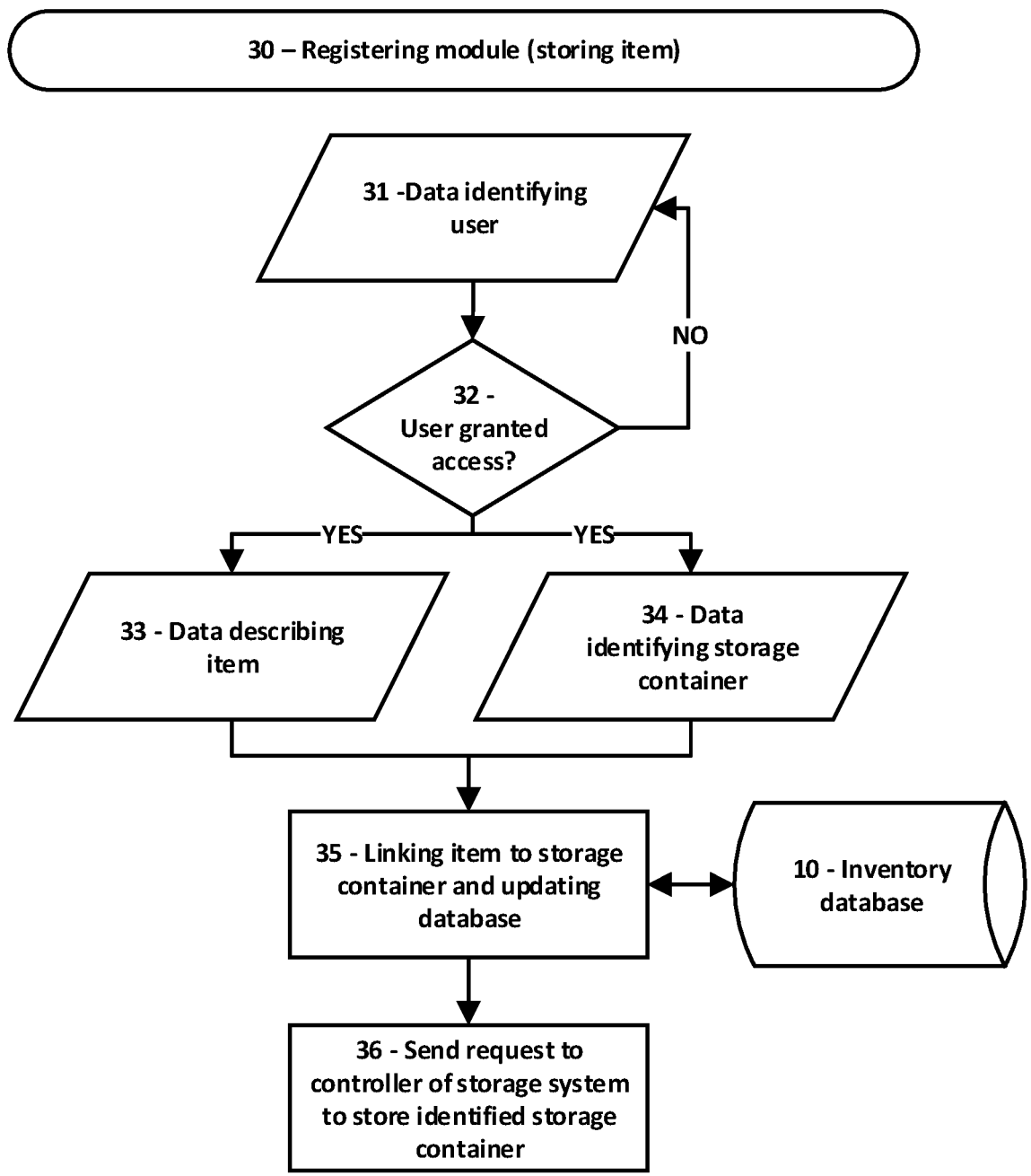
FIG. 3 is a flow chart showing the steps involved in the process of storing items in a centralised automatic storage and retrieval system.
Figure 4:
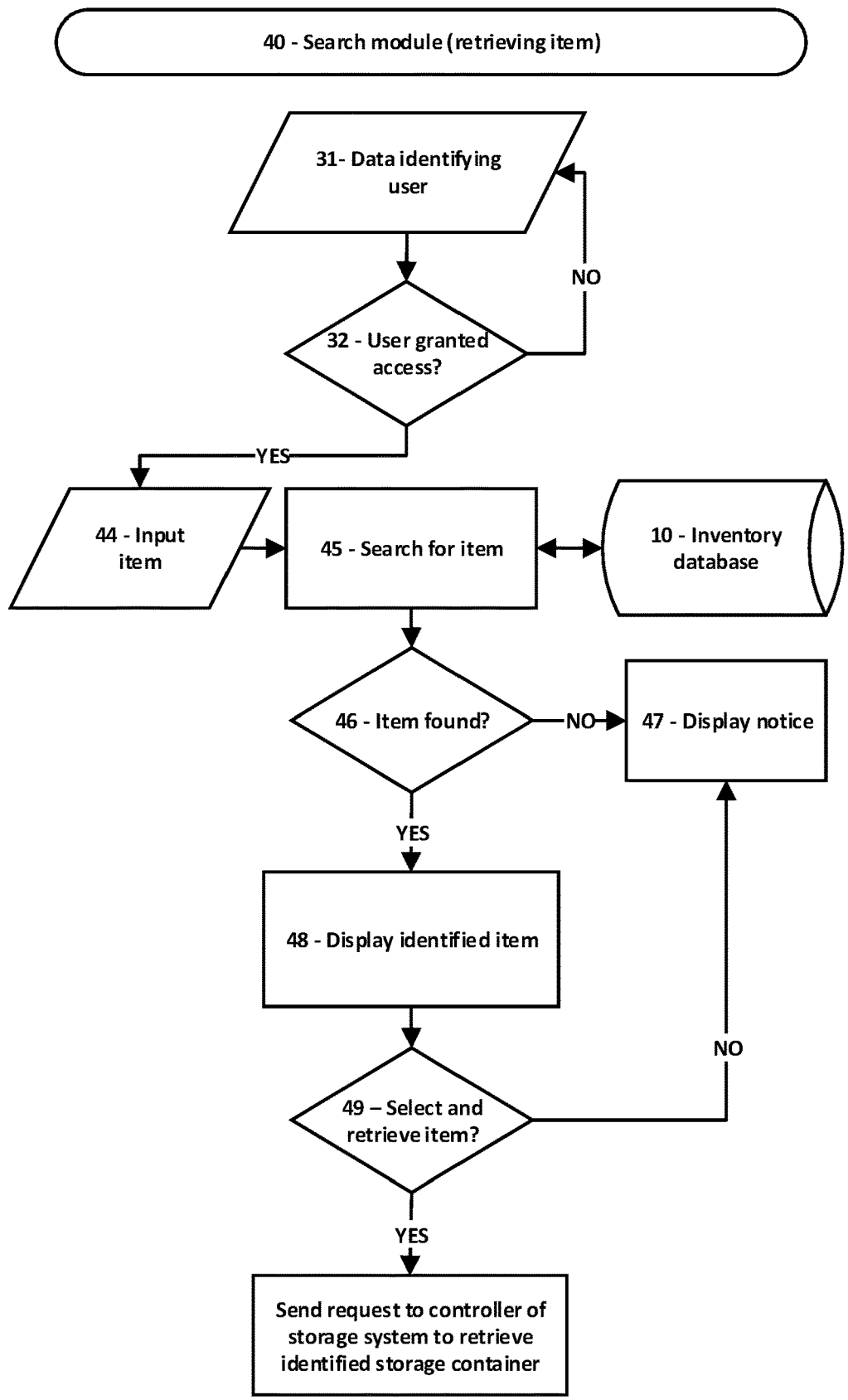
FIG. 4 is a flow chart showing the steps involved in the process of retrieving items from a centralised automatic storage and retrieval system.

FIGS. 3 and 4 are flow charts showing the steps involved in the process of interacting with the inventory database 10 for storing and retrieving items in a centralised automatic storage and retrieval system 2.

When a person is to access the storage and retrieval system 2, a first step 31 is to identify the person/user in a user identification module 20 (ref. FIG. 6).

Examples of identification techniques that may be used are fingerprint, face or voice recognition. A combination of these techniques will provide better security.

If successfully identified in step 32, giving a person/user access to the system via an access station at an interaction area 6. Different users can have access to the same interaction area 6. In this way, different family member will have access to his or her personal storage container 4 from the same interaction area 6.

The next step is storing or retrieving items in the automated storage and retrieval system 2. These will require different method steps.

If an item is to be stored and identification of the user is successful, the next step is to register the item, with data describing it 33, in a registration module 30 (ref. FIG. 6) and link 35 the item to a storage container 4 storing the items. Data describing in item can for example be visual data or verbal data.

The inventory database 10 is then updated with this information. How registering items and linking them to a storage container 4 is performed is described in detail below when describing the different modules of the computer program performing the method. If a user only has a few storage containers, the step of registering items and linking them to the storage containers may be skipped. In this case only the user is linked to the storage containers.

Items may be registered by visual data that are registered in the registration module 30. Items may also be registered by describing them verbally, or with a written description. In yet another embodiment, items can be automatically identified by its visual features, e.g. by means of object recognition.

The next step is generating execution instructions and instructing a controller of the storage and retrieval system 2 to store a storage container 4, ref. step 36 in FIG. 3.

The execution instructions comprise at least information of a specific interaction area 6 to be used and information of the storage container 4 to be stored. Execution instructions are transmitted to a storage and retrieval system controller 100 controlling secure transfer of the storage container to and from the user at the specific interaction area 6. Additional information related to where the storage container is to be stored may also be input. This may for instance be based on whether a storage container is to be stored for a short or long term or stored in a cooled zone of the storage and retrieval system 2.

A storage container 4 may be identified in different ways, e.g. by visual data and/or an RFID tag that is registered in the registration module 30.

If an item is to be retrieved and identification of the user is successful, the user is granted access 32 to a search module 40 and the access station at the interaction area 6. The next step is searching for items 45 in the inventory database 10 by means of a search module 40 receiving input 44 describing the item and presenting search results 48. If found 46, the stored item is displayed by means of a presentation module 50. If an item is not found, a notice will be displayed 47. Stored items can be presented visually and/or verbally. If the user wants to retrieve an item 49, the item is selected and a request for the storage container 4 storing the item is sent to the storage and retrieval system controller 100 which then will instruct a robot 5 to retrieve the storage container and deliver it to the container support assembly 8 which then will bring the storage container to the interaction area where the user is.

Searching for an item in the inventory database 10 may be performed by speech, i.e. inputting verbal data in the search module 40 for identifying an item. Stored items to be retrieved may also be identified by inputting text data in the search module 40.

Figure 5:
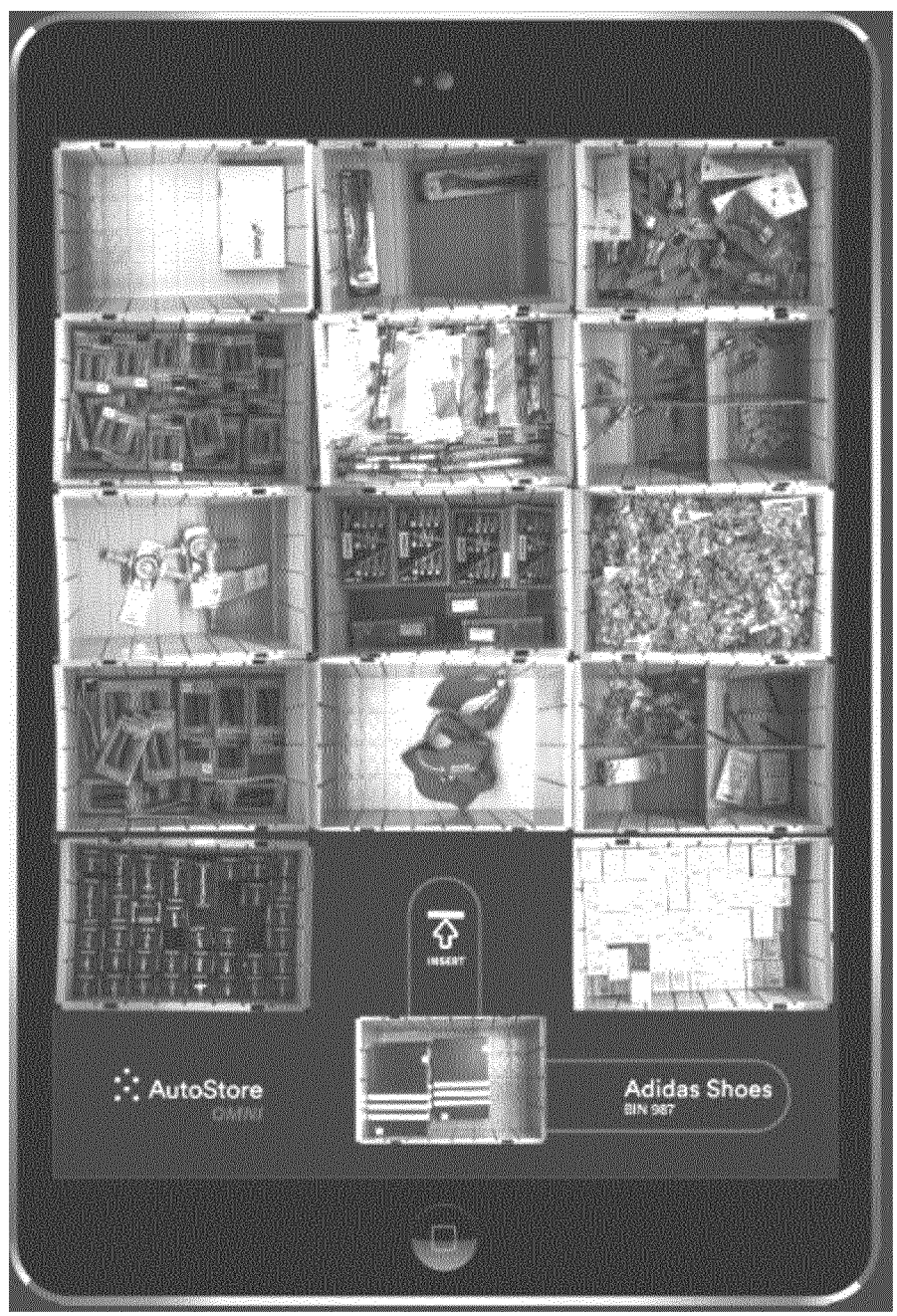
FIG. 5 shows an example of a search result presented visually on a tablet.

FIG. 5 shows an example of a search result presented visually on a tablet or smart phone. By presenting search results as images of different stored items it is easy to choose and select the storage container 4 containing the item(s) to be retrieved.

This way of presenting stored items is useful when a person only has a few, e.g. up to 20 storage containers, and when items placed in the storage containers are not covered by other items.

A visual presentation of items stored in storage containers is especially useful when combined with search phrases. A user may for instance search for books by verbally saying "books" or inputting "books" as a text input. The search module 40 will then identify all storage containers storing books and the presentation module will display the storage containers and their contents.

Images showing content of each storage container will be updated each time items are added or removed from a storage container 4 at the interaction area 6. This is enabled by letting a camera take a picture of the content of a storage container 4. The camera can be installed at the interaction area 6 or it may be a camera in the device running the computer program performing the method described, e.g. tablet or smart phone.

When an item to be retrieved from the storage and retrieval system 2 has been selected, it can be retrieved 49 by generating execution instructions. The instructions comprise at least information of a specific interaction area 6 to be used and which storage container 4 to be retrieved. The execution instructions are transmitted as a request to the storage and retrieval system controller 100 controlling which then will control secure transfer of a specified storage container 4 to the user at the specific interaction area 6.

The computer program for controlling storage and retrieval of personal items can be installed and executed on different devices such as smartphones, tablets and PCs. These devices comprise all means necessary for registering and retrieving items stored in storage containers 4, i.e. processor, input means, display and camera. The program comprises modules that when executed in a processor performs different tasks such as identifying a user, interacting with an inventory database containing information about a user's personal items, and in which storage containers 4 they are stored, and controlling transfer of the storage containers 4 between the storage and retrieval system 2 and a specific interaction area 6 a user is given access to, e.g. a user in 'Apartment 1' has access to interaction area A, while a user in 'Apartment 2' has access to interaction area B.

An automated storage and retrieval system in a building, as the one described as an example above, can be accessed from a program (App) that is installed on a smart phone or tablet. A new user in for instance an apartment, having an access station and an interaction area 6 connected to the automated storage and retrieval system, will be able to access and use the system as soon as the App is installed.

FIG. 6 shows the different modules comprised in the computer program (App) that when executed in a processor controls secure storing and retrieving of a specific storage container linked to a person. Personal items stored in the storage container are registered in an inventory database 10 that may be installed locally, e.g. on the device running the program, or at a remote location, e.g. cloud-based database.

The program according to the invention controls the different steps comprised in the method for controlling secure storage and retrieval of storage containers 4 containing personal items. These steps are performed in different modules of the program.

The modules comprised in the computer program are: a user identification module 20, a registration module 30 and a search module 40. The registration module 30 and the search module 40 are able to communicate with an inventory database 10. The App further comprises a presentation module 50 and an execution module 60. All modules and their purpose and operation will now be explained in detail.

The user identification module 20 identifies a person/user prior to giving access to an interaction area 6 of the centralized storage and retrieval system 2. Persons having access to the storage and retrieval system 2 via an interaction area 6 are registered in a set-up module of the computer program (not shown).

Identification can be performed each time an interaction area 6 of a storage and retrieval system 2 is used, or only once when setting up the system. This will depend on the number of persons having access to an interaction area 6 in an apartment. If only one person is living in an apartment with an interaction area 6, there is no need to identify the user/person each time the storage system is used.

On the other hand, if several persons are living in same apartment sharing an interaction area 6 for a storage and retrieval system 2, the user identification module 20 can be set up to check the identity of a person each time the storage system is used. In this way, the computer program can be configured to give each person in the apartment access to the same interaction area 6, but only to storage containers 4 with personal items that were registered by the person when storing his/her items.

Identification of a person can be implemented in many ways. Examples of known identification methods are passwords or pin codes, biometric methods such as finger print, iris or face recognition etc. Identification could also be implemented through mechanical interaction, for example, with a key, key fob, security card, etc. The key may comprise an electronic chip for an additional level of security. Access to the system via an interaction area 6 is given if identification is successful.

The registration module 30 is adapted for linking and registering items to a storage container 4 storing the items, and for updating the inventory database 10 with this information. Both the items to be stored and the storage container 4 they are stored in are registered.

In a simplified solution, for instance where a user only has a few storage containers 4, only information identifying the storage containers 4 may be registered in the registration module 30.

In a first embodiment, registration of items to be stored in a storage container 4 is performed by registering visual features represented by visual data. The visual data can be provided by a camera capturing images of items placed in a storage container 4. The camera can be installed at the interaction area 6 and have a field of view such that items placed in a storage container 4 are captured.

The camera used for providing visual data for registering items may be integrated in a portable device running the computer program, e.g. smart phone or tablet. A picture of the content of a storage container 4 can then be captured with the portable device and registered in the inventory database 10. Pictured can further be sorted and catalogued.

Object recognition of items may further be applied for identifying items from the visual data, thereby linking identified items to the storage containers 4 they are stored in.

In a second embodiment, identification of items to be stored in a storage container 4 is performed by verbal data. Verbal data can be provided by using a microphone connected to the device running the computer program. A user can then by voice describe items placed in a specific storage container 4.

In a third embodiment, items stored in a storage container 4 can be identified by a written description. Text may also be used as supplemental information to visual data, e.g. the visual data describes a pair of shoes, while a written description describes details such as the size.

In yet another embodiment, items to be stored may also be RFID marked and registered in the inventory database 10.

As understood from the above description, combinations of one or more of the described registration and identification methods are feasible.

In addition to the items to be stored, storage containers 4 may also be identified by visual data. In this case, the visual data may for instance be a barcode captured by a camera.

A storage container 4 may also be identified by an RFID tag. In this embodiment, an RFID reader is provided for registering and inputting storage container identification data to the computer program.

In one embodiment of the invention, only storage containers 4 adapted and accepted for use with the centralised storage and retrieval system 2 will be recognised when being registered and identified by the computer program. If a storage container 4 is not accepted it will not be possible to store the storage container 4 in the storage and retrieval system 2, i.e. the execution module 60 in the computer program will not generate instructions for the storage and retrieval system controller 100 if the storage container 4 is not accepted.

The main task of the registration module 30 of the computer program is to register and link information about items and the storage container 4 they are stored in, as well as updating the inventory database 10 with this information.

The search module 40 is adapted for searching for items stored in the inventory database 10, i.e. items that are already registered in the inventory database 10 as well as the storage container 4 they are stored in.

Searches can be performed via a user interface of a device running the program. If items stored are registered by visual data, the presentation module 50 of the program will send the resulting visual data of a search to a display driver of the device such that all registered items resulting from a search is displayed. A user can then select an item by for instance clicking a displayed item on a touch screen.

Instructions will then be transmitted to a controller 100 of the storage and retrieval system 2 and the item will be retrieved from the centralized storage and retrieval system 2.

If additional written information about items stored is available, search phrases can be input, and items resulting from a search will be presented.

Search phrases may also be input by means of verbal data as mentioned above when describing items to be registered in the registration module 30. In this case a storage and retrieval system 2, controlled by the computer program according to the invention, can be operated by voice only.

The presentation module 50 of the computer program is adapted for presenting items that are stored in the storage and retrieval system 2 as well as search results.

Presentation of stored items and search results can in one embodiment be performed by displaying them on a display. This is typically the display of the device running the computer program. In another embodiment, the presentation module 50 may present items stored as verbal data, i.e. spoken words through a speaker.

The execution module 60 is adapted for generating execution instructions to the storage and retrieval system controller 100 storing or retrieving an identified storage container 4. The execution module 60 is linked to a communication module 70 communicating with a controller 100 of the storage and retrieval system.

The communication module 70 is adapted for exchanging execution information between the computer program controlling storing and retrieving of personal items and the controller 100 of the storage and retrieval system 2.

All information related to items stored, and in which storage containers 4 they are stored is controlled by the computer program according to the invention.

If a user has just a few storage containers 4, the user may store and register only information related to the storage containers 4, i.e. content of a storage containers 4, if any, does not necessarily have to be registered. When requesting a storage container 4, the user only needs to input which storage container 4 that is requested, e.g. get my second storage container.

When handling a storage container 4, the information exchanged from the communication module 70 in the computer program to the storage and retrieval system controller 100 is the unique identification of the storage container 4, whether it is to be stored or retrieved and which interaction area 6 that is to be used.

Additional information related to where in the storage and retrieval system 2 the storage container 4 is to be stored may also be input.

When storing a specified storage container 4, the execution module 60 generates instructions to the storage and retrieval system controller 100 to store the storage container 4 identified with its unique identification. The instructions are transmitted via the communication module 70 to the storage and retrieval system controller 100 which will then link the identified storage container 4 to its own registration system which is keeping track of where each identified storage container 4 is to be stored, i.e. in which column, and at what level in the column it is to be stored.

When retrieving a specified storage container 4, the execution module 60 generates instructions to the storage and retrieval system controller 100 to retrieve the storage container 4 identified with its unique identification. The instructions are transmitted via the communication module 70 to the storage and retrieval system controller 100 which will then look up the identified storage container 4 in its own registration system keeping track of where each identified storage container 4 is stored, i.e. in which column, and at what level in the column it is stored.

The registration module 30 keeps track of items stored or to be stored, as well as in which storage container 4 they are stored. The execution module 60 instructs the storage and retrieval system controller 100 which storage container 4 to store or retrieve.

Only storage containers 4 belonging to specific persons may be accessible from a defined interaction area 6. This may be the interaction area 6 that was used when for storing storage containers. This may be the default for getting access to a storage container 4.

A user may access a storage container 4 from an interaction area 6 other than the one used for storing a storage container 4. This functionality can be implemented as an option in the computer program, and where access from the other interaction area 6 is given by inputting a code or other identification before a user is given access.

As mentioned, the computer program according to the invention generates instructions via the execution module 60. The instructions are transmitted to the storage and retrieval system controller 100 by means of the communication module 70, i.e. to store or retrieve an identified storage container 4. As an option, a final check to ensure that the storage container 4 retrieved to an interaction area 6 is the correct one is to check the identification of the storage container 4 prior to outputting the storage container via an access station at the interaction area 6.

Additional information may be exchanged from the execution module 60 to the storage and retrieval system controller 100. This additional information may for instance be where in the storage and retrieval system 2 a storage container 4 should be stored. This can be useful for long term or short term storing, depending on whether a storage container is expected to be retrieved frequently from the storage system or not.

There may be special allocated areas in the centralized storage and retrieval system 2 reserved for storing items at specific temperatures. The additional information may then be whether a storage container 4 is to be stored in a cooled zone of the storage and retrieval system 2, e.g. when items stored are food and beverage. Where in the storage and retrieval system 2 a storage container 4 is stored will influence how fast it can be retrieved at an interaction area 6.

In addition to the different modules described above, the computer program may further comprise a set-up module for setting up different parameters defining the automatic storage and retrieval system that is installed and accessed by the computer program. This set-up module is sharing information with the controller 100 of the storage and retrieval system 2. Parameters exchanged may include the capacity of the storage system; number of storage containers 4 that a user can use for storage of personal items; number of interaction areas 6 that is available for a person.

The method and computer program according to the invention provides high security. A thief who has gained access to the storage grid will not be able to access individual storage containers easily because of the nature of the stacks of storage containers. This makes the system well adapted to storing personal items, particularly those which might be valuable. The compactness of a centralised automated storage and retrieval system of this form is also a benefit in an apartment building scenario where space is always an issue.

The invention claimed is:

1. A method for controlling secure storing and retrieving of a storage container for storing items by transferring the storage container via an interaction area among a plurality of interaction areas of an automated storage and retrieval system in a building with a number of apartments, where the interaction areas have access stations serving different apartments, and where a container transport assembly connects the automated storage and retrieval system to the interaction areas, where each storage container is linked to a user and items stored and each storage container stores a plurality of items, and where the method is performed by a user operable control system, the method comprising:
   receiving user identification data in a user identification module and processing the user identification data to identify the user and if the user is identified granting access to an access station at the interaction area so that the user can store or retrieve a storage container linked to the user and add or remove an item from the storage container;
   for storing an item of a user that is granted access to the access station: registering the item in a registration module and linking the item to an identified storage container linked to the user, and updating an inventory database with information about the item and the storage container;
   for retrieving an item of a user that is granted access to the access station: searching for the item in the inventory database by means of a search module comprised in the user operable control system and presenting search results and items stored by means of a presentation module, and selecting the item to be retrieved from the presentation module and identifying the storage container where the selected item is stored and that is linked to the user,
   generating execution instructions in an execution module, the instructions comprise information of a specific interaction area to be used and information of the storage container to be transferred and transmitting the execution instructions, by means of a communication module to a storage and retrieval system controller controlling secure transferal of the storage container to and from the user at the specific interaction area via the container transport assembly.

2. The method according to claim 1, wherein registering an item is performed by visual data that is registered in the registration module.

3. The method according to claim 1, wherein registering an item is performed by verbal data that is registered in the registration module.

4. The method according to claim 1, wherein registering an item is performed by visual, verbal and text data that is registered in the registration module.

5. The method according to claim 1, wherein identifying a storage container is performed by visual data that is registered in the registration module.

6. The method according to claim 1, wherein identifying a storage container is performed by reading an RFID tag that is registered in the registration module.

7. The method according to claim 1, wherein searching for an item in the inventory database is performed by means of verbal data input in the search module.

8. The method according to claim 1, wherein searching for an item in the inventory database is performed by means text data input in the search module.

9. The method according to claim 1, wherein stored items and search results are presented visually.

10. The method according to claim 1, wherein stored items and search results are presented verbally.

11. A computer program product comprising different modules that when executed in a processor controls secure storing and retrieving of a storage container for storing items by transferring the storage container via one specific interaction area among several interaction areas of an automated storage and retrieval system in a building with a number of apartments, where the interaction areas have access stations serving different apartments, and where a container transport assembly connects the automated storage and retrieval system to the interaction areas, where each storage container is linked to a user and items stored and each storage container stores a plurality of items, the computer program product comprising:
   a user identification module for identifying a user and controlling access for the user to a specific interaction area;
   a registration module for registering and linking items to an identified storage container storing the items and for updating an inventory database with information about the items and the storage container;
   a search module for searching for items in the inventory database;
   a presentation module for presenting search results of stored items;
   an execution module for generating execution instructions comprising information about the specific interaction area to be used and information of the storage container to be transferred, and
   a communication module for transmitting the execution instructions to a storage and retrieval system controller controlling secure transferring of the storage container to and from the user at the specific interaction area via the container transport assembly.

12. The computer program product according to claim 11, wherein the registration module registers items by visual data.

13. The computer program product according to claim 12, wherein object recognition of the visual data is used for identifying items.

14. The computer program product according to claim 11, wherein the registration module registers items by verbal data.

15. The computer program product according to claim 11, wherein the registration module registers items by combination of visual, verbal and text data.

16. The computer program product according to claim 11, wherein the registration module registers a storage container by visual data.

17. The computer program product according to claim 11, wherein the registration module registers a storage container by an RFID tag.

18. The computer program product according to claim 11, wherein the search module is adapted for receiving and identifying verbal input.

19. The computer program product according to claim 11, wherein the search module is adapted for receiving and identifying text input.

20. The computer program product according to claim 11, wherein the presentation module outputs visual data.

21. The computer program product according to claim 11, wherein the presentation module outputs verbal data.

* * * * *